United States Patent
Fukubayashi et al.

(10) Patent No.: US 10,584,212 B2
(45) Date of Patent: Mar. 10, 2020

(54) POLYAMIDE-IMIDE, RAW MATERIAL SALT OF POLYAMIDE-IMIDE, AND PRODUCTION METHOD THEREOF

(71) Applicant: UNITIKA LTD., Amagasaki-shi, Hyogo (JP)

(72) Inventors: Yumeto Fukubayashi, Uji (JP); Makoto Nakai, Uji (JP); Akira Shigeta, Uji (JP); Munenori Yamada, Uji (JP)

(73) Assignee: UNITIKA LTD., Hyogo (JP)

( * ) Notice: Subject to any disclaimer, the term of this patent is extended or adjusted under 35 U.S.C. 154(b) by 56 days.

(21) Appl. No.: 15/564,678

(22) PCT Filed: Apr. 6, 2016

(86) PCT No.: PCT/JP2016/061297
§ 371 (c)(1),
(2) Date: Oct. 5, 2017

(87) PCT Pub. No.: WO2016/163417
PCT Pub. Date: Oct. 13, 2016

(65) Prior Publication Data
US 2018/0072848 A1    Mar. 15, 2018

(30) Foreign Application Priority Data

Apr. 7, 2015  (JP) .................. 2015-078793
Apr. 7, 2015  (JP) .................. 2015-078794

(51) Int. Cl.
*C08G 73/14* (2006.01)
*C08L 79/08* (2006.01)

(52) U.S. Cl.
CPC .............. *C08G 73/14* (2013.01); *C08L 79/08* (2013.01)

(58) Field of Classification Search
CPC .................. C08G 73/14; C08L 79/08
See application file for complete search history.

(56) References Cited

U.S. PATENT DOCUMENTS

| | | | | |
|---|---|---|---|---|
| 4,066,631 A * | 1/1978 | Dimmig | .................. | C08G 73/14 528/170 |
| 4,183,839 A * | 1/1980 | Gagliani | .............. | C07D 209/48 523/307 |
| 4,291,149 A | 9/1981 | Keske et al. | | |
| 4,348,513 A * | 9/1982 | Keske | .................... | C08G 73/14 528/125 |
| 4,861,862 A | 8/1989 | Tyrell et al. | | |
| 5,587,452 A | 12/1996 | Koning et al. | | |
| 5,939,520 A | 8/1999 | Langsam | | |

FOREIGN PATENT DOCUMENTS

| FR | 2399452 | * | 3/1979 |
|---|---|---|---|
| GB | 1116379 A | | 6/1968 |
| JP | 42-15637 B | | 8/1967 |
| JP | 44-19274 B | | 8/1969 |
| JP | 45-2397 B | | 1/1970 |
| JP | 49-4077 B | | 1/1974 |
| JP | 50-33120 B | | 10/1975 |
| JP | 55-120628 A | | 9/1980 |
| JP | WO 81/02016 A1 | | 7/1981 |
| JP | 56-501883 A | | 12/1981 |
| JP | 62-39629 A | | 2/1987 |
| JP | 63-117035 A | | 5/1988 |
| JP | 8-48775 A | | 2/1996 |
| JP | 8-59614 A | | 3/1996 |
| JP | 11-128703 A | | 5/1999 |
| JP | 2001-122858 A | | 5/2001 |

(Continued)

OTHER PUBLICATIONS

Extended European Search Report for European Application No. 16776578.3, dated Dec. 5, 2017.
IFA, "Ammonia Aqueous Solution", retrieved from GESTIS Substance Database, http://gestis-en.itrust.de/nxt/gateway.dll/gestis_en/001750.xml?f=templates&fn=print.htm&global=G_&G_DIEXSL=GESTIS-PRINT.XSL, Retrieved Jan. 15, 2019, pp. 1-4.
International Preliminary Report on Patentability and English translation of the Written Opinion of the International Searching Authority issued in the corresponding International Application No. PCT/JP2016/061297 dated Oct. 19, 2017.
International Search Report for PCT/JP2016/061297 (PCT/ISA/210) dated Jul. 12, 2016.
International Preliminary Report on Patentability and Written Opinion of the International Searching Authority (forms PCT/IB/373, PCT/ISA/237 and PCT/IB/338), dated Oct. 19, 2017, for International Application No. PCT/JP2016/061291, with an English translation of the Written Opinion.

(Continued)

Primary Examiner — Gregory Listvoyb
(74) Attorney, Agent, or Firm — Birch, Stewart, Kolasch & Birch, LLP

(57) ABSTRACT

The present invention is to provide a polyamide-imide which has a high regularity of molecular structure and few branched structures, does not contain hydrogen halide, is not required to be separated and purified in post processes, and can be suitably used as a film, a varnish, or a molding material; raw material salt of polyamide-imide and production method thereof.
The polyamide-imide has a repeating unit represented by the general formula (1):

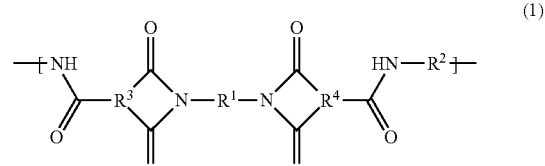

in which $R^1$, $R^2$ represent independently a divalent residue having an aromatic ring, an aliphatic ring or an aliphatic hydrocarbon; $R^3$, $R^4$ represent independently a trivalent residue having an aromatic ring or an aliphatic ring; and an hydrogen atom bonding to the respective rings may be replaced by another atom or an atomic group.

2 Claims, No Drawings

(56) References Cited

FOREIGN PATENT DOCUMENTS

JP  2007-119395 A  5/2007
WO  WO 2011/121850 A1  10/2011

OTHER PUBLICATIONS

International Search Report (form PCT/ISA/210), dated Jul. 5, 2016, for International Application No. PCT/JP2016/061291, with an English translation.
Chemspider, "m-Xylylenediamine data sheet," Obtained Sep. 12, 2018, pp. 1-4.
Chemspider, Trimellitic anhydride data sheet, Obtained Sep. 12, 2018, pp. 1-4.
European Patent Office Communication and extended search report issued in the corresponding European Patent Application No. 16776583.3 dated Mar. 21, 2018.
Chinese Search Report and Office Action, dated Jul. 3, 2019, for Chinese Application No. 201680020195.3, with a partial English translation of the Chinese Search Report.
Taiwanese Office Action and Search Report dated May 15, 2019 for Application No. 105110738 with an English translation of the Office Action.
Taiwanese Office Action and Search Report dated May 15, 2019 for Application No. 105110739 with an English translation of the Office Action.

\* cited by examiner

POLYAMIDE-IMIDE, RAW MATERIAL SALT OF POLYAMIDE-IMIDE, AND PRODUCTION METHOD THEREOF

TECHNICAL FIELD

The present invention relates to a polyamide-imide, a raw material salt of polyamide-imide, and a production method thereof.

BACKGROUND ART

Since a polyamide-imide has high heat resistance and chemical resistance, it is widely used for applications such as films, electric wire coating materials, molding materials, and adhesive materials.

As methods of production of the polyamide-imide, three methods are known: an isocyanate method, an acid chloride method, and a direct polymerization method.

The isocyanate method is a method of reacting imidodicarboxylic acid, synthesized from aromatic tricarboxylic acid anhydride or aromatic tricarboxylic acid anhydride/aromatic diamine (molar ratio 2/1), with aromatic diisocyanate (for example, Patent Documents 1 to 3).

The acid chloride method is a method of reacting substantially equimolar amounts of aromatic tricarboxylic acid anhydride chloride and aromatic diamine in an organic polar solvent (for example, Patent Document 4).

The direct polymerization method is a method of directly reacting aromatic tricarboxylic acid or a derivative thereof (excluding an acid chloride derivative) and aromatic diamine in the presence of a dehydration catalyst (for example, Patent Document 5).

PRIOR ART DOCUMENT

Patent Documents

Patent Document 1: Japanese Examined Patent Publication No. 44-19274
Patent Document 2: Japanese Examined Patent Publication No. 45-2397
Patent Document 3: Japanese Examined Patent Publication No. 50-33120
Patent Document 4: Japanese Examined Patent Publication No. 42-15637
Patent Document 5: Japanese Examined Patent Publication No. 49-4077

SUMMARY OF INVENTION

Technical Problems

However, in the isocyanate method, since diisocyanate is used as a raw material, there has been a problem that in an initial stage of the reaction, in addition to amide bonds and imide bonds, urea bonds are formed by side reactions, and a high-purity polyamide-imide resin cannot be obtained, or a branched structure is formed, so that a gelation phenomenon originating from the branched structure occurs, and a linear polymer having a high degree of polymerization cannot be obtained. Moreover, in the isocyanate method, there has been a problem that when an amide solvent such as N-methylpyrrolidone is used as a solvent, the amide solvent reacts with diisocyanate.

On the other hand, while the acid chloride method has relatively few side reactions and gives polyamide-imide with few crosslinked structures, there is such problems as hydrogen chloride with high corrosiveness is by-produced and remains in the polyamide-imide. In addition, in the acid chloride method, there has been a problem that since an amine end of diamine reacts with both a chloride end and an anhydride group of aromatic tricarboxylic acid anhydride chloride, regularity in a molecular chain is low. Consequently, when the obtained polyamide-imide is used in a molded article, the physical properties of the molded article are not satisfactory, and the application to be used has been restricted.

In the direct polymerization method, since no diisocyanate or acid chloride is used, there is no problem of gelation or generation of hydrogen chloride. However, as in the acid chloride method, there has been a problem that since an amine end of diamine is reacted with both a carboxyl end and an anhydride group of aromatic tricarboxylic acid anhydride, the regularity in the molecular chain is low. Consequently, when the obtained polyamide-imide is used in a molded article, the physical properties of the molded article are not satisfactory, and the application to be used has been restricted.

Since the above three methods of production of polyamide-imide are all carried out in a solution, it has been necessary to separate and purify polyamide-imide from the obtained polyamide-imide solution in order to use polyamide-imide as a molded article.

The present invention solves the above-mentioned problems, and an object of this invention is to provide polyamide-imide which has a high regularity of molecular structure and few branched structures, does not contain hydrogen halide, is not required to be separated and purified in post processes, and can be suitably used as a film, a varnish, or a molding material.

Solutions to Problems

As a result of intensive studies on the above-mentioned problems, the present inventors have found that the problems can be solved by synthesizing polyamide-imide from bisimide dicarboxylic acid comprised of diamine and tricarboxylic acid anhydride, and diamine identical to or different from the diamine, thus arriving at the present invention.

That is, the gists of the present invention are as follows.
(1) A polyamide-imide, including a repeating unit represented by the general formula (1):

[Chemical Formula 1]

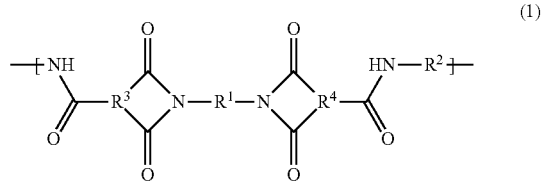

(in which $R^1$, $R^2$ represent independently a divalent residue having an aromatic ring, an aliphatic ring or an aliphatic hydrocarbon; $R^3$, $R^4$ represent independently a trivalent residue having an aromatic ring or an aliphatic ring; and a hydrogen atom bonding to the respective rings may be replaced by another atom or an atomic group.)

(2) A method of production of the polyamide-imide including the repeating unit represented by the above general formula (1), wherein the polyamide-imide is polymerized from a bisimide dicarboxylic acid and a diamine.

(3) A method of production of the polyamide-imide including the repeating unit represented by the above general formula (1), wherein a raw material salt of polyamide-imide including a bisimide dicarboxylic acid and a diamine is polymerized.

Effects of Invention

The present invention can provide polyamide-imide which has a high regularity of molecular structure and few branched structures, does not contain hydrogen halide, is not required to be separated and purified in post processes, and can be suitably used as a film, a varnish, or a molding material.

DESCRIPTION OF EMBODIMENTS

A polyamide-imide of the present invention is a polyamide-imide constituted of a bisimide dicarboxylic acid and a diamine and having a repeating unit represented by the general formula (1).

[Chemical Formula 2]

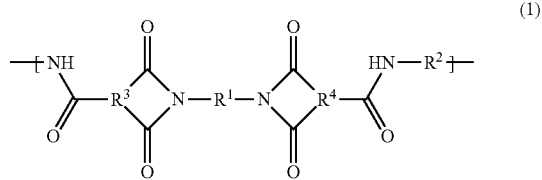

(1)

In the above formula, $R^1$, $R^2$ represent independently a divalent residue having an aromatic ring, an aliphatic ring or an aliphatic hydrocarbon; $R^3$, $R^4$ represent independently a trivalent residue having an aromatic ring or an aliphatic ring; and a hydrogen atom bonding to the respective rings may be replaced by another atom or an atomic group. The number of the repeating units is an integer of 1 or more, preferably 4 to 1000, more preferably 20 to 1000.

A tricarboxylic acid anhydride used in the bisimide dicarboxylic acid is an aromatic or alicyclic tricarboxylic acid anhydride. Examples of a tricarboxylic acid ring include a benzene ring, a naphthalene ring, an anthracene ring, a biphenyl ring, a cyclohexane ring, preferably a benzene ring, a naphthalene ring, a biphenyl ring, a cyclohexane ring, more preferably a benzene ring, a cyclohexane ring, still more preferably a benzene ring.

Tricarboxylic acid includes those in which a hydrogen atom bonding to a ring is replaced by another atom or an atomic group.

Specific examples of the tricarboxylic acid anhydride include trimellitic acid anhydride, 2,3,6-naphthalene tricarboxylic acid anhydride, 2,3,6-anthracene tricarboxylic acid anhydride, 3,4,4'-biphenyl tricarboxylic acid anhydride, 1,2,4-cyclohexane tricarboxylic acid anhydride and the like, preferably trimellitic acid anhydride, 2,3,6-naphthalene tricarboxylic acid anhydride, 3,4,4'-biphenyl tricarboxylic acid anhydride, 1,2,4-cyclohexane tricarboxylic acid anhydride, more preferably trimellitic acid anhydride, or 1,2,4-cyclohexane tricarboxylic acid anhydride, still more preferably trimellitic acid anhydride. The tricarboxylic acid anhydride may be used singly or in combination of two or more kinds.

The diamine used in the bisimide dicarboxylic acid is an aliphatic diamine, an alicyclic diamine, or an aromatic diamine. Preferably, the diamine is an aliphatic diamine or an aromatic diamine. The diamine may contain —O— and —S—, and one or more hydrogen atoms may be replaced by halogen or may have a side chain.

Specific examples of the diamine include hexamethylenediamine, heptamethylenediamine, octamethylenediamine, nonamethylenediamine, decamethylenediamine, m-phenylenediamine, p-phenylenediamine, m-xylylenediamine, p-xylylenediamine, benzidine, 4,4'-diaminodiphenylpropane, 4,4'-diaminodiphenylmethane, 4,4'-diaminodiphenyl sulfide, 3,3'-diaminodiphenyl sulfone, 4,4'-diaminodiphenyl ether, 1,5-diaminonaphthalene, 3,3-diaminonaphthalene, 1,4-diaminocyclohexane, 1,10-diamino-1,10-dimethyldecane, and 1,4-bis (aminomethyl) cyclohexane.

Preferred examples include m-phenylenediamine, p-phenylenediamine, m-xylylenediamine, p-xylylenediamine, 4,4'-diaminodiphenyl ether, benzidine, more preferably m-phenylenediamine, p-phenylenediamine, m-xylylenediamine, p-xylylenediamine, 4,4'-diaminodiphenyl ether, still more preferably an aliphatic diamine selected from m-xylylenediamine and p-xylylenediamine, or an aromatic diamine selected from p-phenylenediamine and 4,4'-diaminodiphenyl ether.

These diamines may be used singly or in combination of two or more kinds.

As the diamine constituting the polyamide-imide, the same or different diamine used in bisimidecarboxylic acid can be used.

The polyamide-imide of the present invention can be (1) synthesized by synthesizing once a raw material salt of polyamide-imide including bisimide dicarboxylic acid and diamine and then polymerizing the raw material salt of polyamide-imide (hereinafter referred to as "two-step synthesis method"), or can be (2) synthesized in one step by reacting directly a bisimide dicarboxylic acid with a diamine (hereinafter referred to as "one-step synthesis method").

First, the two-step synthesis method will be described.

(Two-Step Synthesis Method)

In the two-step synthesis method, the polyamide-imide of the present invention can be produced by synthesizing once a raw material salt of polyamide-imide formed of a bisimide dicarboxylic acid and a diamine and heating and polymerizing the raw material salt.

As the bisimide dicarboxylic acid, a known one (for example, a commercially available product) may be used, or for example, a product synthesized from a tricarboxylic acid anhydride and a diamine may be used.

In the case of synthesizing a bisimide dicarboxylic acid, the reaction between the tricarboxylic acid anhydride and the diamine may be performed in a solution state or molten state, or in a solid (powder) state; however, a solid state is preferable from the viewpoint of allowing use in synthesis of a powder of a raw material salt of polyamide-imide without requiring a solvent-drying process, a pulverization process, and the like.

The raw material salt of polyamide-imide can be obtained by neutralizing a bisimide dicarboxylic acid, synthesized from a tricarboxylic acid anhydride and a diamine, with a diamine which is identical to or different from the above diamine.

The method for obtaining the raw material salt of polyamide-imide by the reaction of the bisimide dicarboxylic acid and the diamine may be carried out in a solution state or molten state or in a solid state. A solid state is preferable from the viewpoint of allowing synthesis of a powder of a raw material salt of polyamide-imide without requiring a solvent-drying process, a pulverization process, and the like.

Hereinafter, the method of obtaining the raw material salt of polyamide-imide by the reaction of the bisimide dicarboxylic acid and the diamine is described.

The raw material salt of polyamide-imide of the present invention can be achieved by reacting a liquid diamine with a solid bisimide dicarboxylic acid, specifically by heating a bisimide dicarboxylic acid at a temperature less than its melting point and not less than the melting point of the diamine and adding a diamine.

In order to maintain the solid state of the bisimide dicarboxylic acid and the raw material salt of polyamide-imide to be obtained during the process, it is preferable to set suitably the conditions such as an addition amount of the diamine, an addition rate, an addition method, a heating temperature of the bisimide dicarboxylic acid, and a reaction time, and to stir the contents sufficiently.

The "melting point" is also called as "a fusing point" and is used in the general meaning of the temperature at which a solid melts. The melting point can be determined by heating a sample filled in a capillary and visually observing the melting point, or by means of a measuring apparatus such as differential scanning calorimetry (DSC).

In the present invention, as described above, the bisimide dicarboxylic acid maintains its solid state. The average particle size of the bisimide dicarboxylic acid is preferably 5 μm to 1 mm, more preferably 20 to 200 μm. When the particle size of the imidodicarboxylic acid is 5 m to 1 mm, the progress of the reaction of the raw material salt of polyamide-imide can be accelerated.

The average particle size can be measured by a sedimentation method or laser diffraction/scattering method, and in the present invention, the value measured by the laser diffraction/scattering method is used.

The diamine is not particularly limited as long as it is in a liquid state at the time of reaction with a solid bisimide dicarboxylic acid, and may be added as a solid or may be added after being heated and melted into a liquid state. From the viewpoint of further reducing the particle size of the obtained raw material salt of polyamide-imide, it is preferable that the diamine is added after being heated and melted into a liquid state.

The shorter the time for heating the diamine, the more preferable it is, and therefore, from the viewpoint, it is preferable that the diamine is added in a solid form such as a powder or a granular form, which itself is not heated.

In the case of adding the diamine as a solid, for example, a powder sending device equipped with a double damper mechanism is exemplified. On the other hand, when the diamine is added as a liquid, the diamine is heated and melted into a liquid in a vessel other than a reaction vessel and then conveyed into the reaction vessel, and the diamine in a liquid form is preferably dropped to a bisimide dicarboxylic acid or sprayed in a spray-like form to the bisimide dicarboxylic acid.

In the present invention, although the bisimide dicarboxylic acid may be heated after the addition of the diamine or before the addition of the diamine, the latter is more preferable.

The heating temperature in heating the bisimide dicarboxylic acid in advance before the addition of the diamine is preferably set at a temperature equal to or higher than the melting point of the diamine and lower than the melting point of the bisimide dicarboxylic acid, and is more preferably set at a temperature equal to or higher than (the melting point of the diamine +10° C.) and equal to or lower than (the melting point of the bisimide dicarboxylic acid −5° C.). When the heating temperature exceeds the melting point of the bisimide dicarboxylic acid, the whole of the reaction system is liquefied, and the whole reaction system may be agglomerated in bulk as the raw material salt of polyamide-imide is produced. On the other hand, when the heating temperature is equal to or lower than the melting point of the diamine, the bisimide dicarboxylic acid and the diamine are both in a solid state, and thus, the formation reaction of the raw material salt of polyamide-imide may be hardly allowed to proceed.

In the aforementioned heating temperature range, the heating temperature of the bisimide dicarboxylic acid is 100° C. or higher and 210° C. or lower, preferably 100° C. or higher and 200° C. or lower, more preferably 120° C. or higher and 200° C. or lower. When the heating temperature exceeds 210° C., the polymerization reaction occurs to generate water during the formation reaction of the raw material salt of polyamide-imide, and consequently, due to the generated water, the obtained raw material salt of polyamide-imide is sometimes partially melted to cause fusion, or the pressure of the reaction system sometimes becomes high. On the other hand, when the heating temperature is lower than 100° C., the formation reaction of the raw material salt of polyamide-imide is sometimes insufficient.

The heating temperature in heating the bisimide dicarboxylic acid in advance and the reaction temperature in the production of the raw material salt of polyamide-imide may be either the same temperature or different temperatures.

The addition method of the diamine is not particularly limited as long as the addition method is capable of maintaining the condition of being in the solid form of the bisimide dicarboxylic acid during the reaction. Among such methods, from the viewpoint of suppressing bulky agglomeration of the obtained raw material salt of polyamide-imide and thus efficiently performing the formation reaction of the raw material salt of polyamide-imide, for example, the following methods are preferable: a method in which diamine is continuously added, or a method in which the diamine is intermittently added in a divided manner in an appropriate amount at a time (for example, at a time, in ¹⁄₁₀ to ¹⁄₁₀₀ of the total amount of the diamine to be added). From the viewpoint of stably maintaining the condition of being in solid form of the bisimide dicarboxylic acid, the addition rate of the diamine is preferably from 0.005 to 2.00% by mass/min, more preferably from 0.01 to 1.00% by mass/min. Here, "% by mass/min" means the ratio of the amount of the low melting point component added in 1 minute to the total amount of the low melting point component added eventually. Alternatively, the diamine may be intermittently added in an appropriate amount at a time and subsequently the diamine may be added continuously. In other words, the forgoing methods may be combined.

If the reaction between the diamine and the bisimide dicarboxylic acid is less likely to progress uniformly, the diamine may be dissolved in a dilute solvent and added to the bisimide dicarboxylic acid. Examples of dilute solvents include water, alcohols such as methanol and ethanol, ethers such as tetrahydrofuran and diethylene glycol, and amide solvents such as N-methyl-2-pyrrolidone and N,N-dimethylacetamide.

The average particle size of the obtained raw material salt of polyamide-imide is preferably 2 mm or less, more preferably 500 m or less. When the average particle size of the raw material salt of polyamide-imide is 2 mm or less, for example, even if moisture is generated in solid-phase polymerization of the raw material salt of polyamide-imide to obtain polyamide-imide, moisture inside the raw material salt of polyamide-imide is easily escaped, and therefore, there is an advantage that the rate of the polymerization reaction can be increased.

In the production method of a raw material salt of polyamide-imide of the present invention, for the purpose of completely performing the formation reaction of the raw material salt of polyamide-imide, the reaction mixture is preferably sufficiently stirred during the addition of the diamine and after the completion of the addition of the diamine. The stirring mechanism disposed in the reactor for allowing the bisimide dicarboxylic acid and the diamine to react with each other may be appropriately selected according to the type or production amount of the produced raw material salt of polyamide-imide; examples of such a stirrer include a paddle type blender, a tumbler type blender and a ribbon type blender or mixer. These may also be combined.

A reaction apparatus for allowing the bisimide dicarboxylic acid and the diamine to react with each other is not particularly limited as long as the reaction apparatus is capable of stirring sufficiently the bisimide dicarboxylic acid and the diamine. Known reaction apparatus can be used.

In the reaction apparatus, the method for heating the bisimide dicarboxylic acid before the reaction and the method for heating the reaction system in the formation reaction are not particularly limited; examples of such methods include the methods of heating by using a heating medium such as steam or by using a heater.

In the present invention, the reaction between the bisimide dicarboxylic acid and the diamine may be performed in an air atmosphere or in an atmosphere of an inert gas such as nitrogen; however, for the purpose of suppressing side reactions and coloration, the reaction between the bisimide dicarboxylic acid and the diamine is preferably performed in an inert gas atmosphere. The reaction may be performed under a sealed condition or in a flow of an inert gas.

According to the above method of obtaining the raw material salt of polyamide-imide by the reaction of the bisimide dicarboxylic acid and the diamine in the solid state, it is possible to provide a particulate raw material salt of polyamide-imide from which polyamide-imide can be easily obtained at low cost without the need for removing a solvent after the reaction and without using a poor solvent or a washing solution.

The present invention provides:
(1) a raw material salt of polyamide-imide, comprising a bisimide dicarboxylic acid and a diamine;
(2) a production method of a raw material salt of polyamide-imide described in the above (1), in which the bisimide dicarboxylic acid is heated between a temperature lower than the melting point of the bisimide dicarboxylic acid and a temperature not lower than the melting point of the diamine, and the diamine is added while the bisimide dicarboxylic acid maintains its solid states; and
(3) a production method of a raw material salt of polyamide-imide described in (2), in which the diamine is added to the bisimide dicarboxylic acid with the diamine dissolved in a dilute solvent.

While a polymerization method of a raw material salt of polyamide-imide may be either a melt polymerization method or a solid-phase polymerization method, the flow initiation temperature is often close to a thermal decomposition temperature in polyamide-imide, and therefore, the solid-phase polymerization method is preferable.

In the solid-phase polymerization method, while the reaction temperature is not particularly limited as long as it is lower than the melting point of the polyamide-imide to be produced or lower than the decomposition temperature, the reaction temperature is usually 160 to 350° C. The reaction time is preferably in the range of 0.5 to 24 hours, more preferably in the range of 0.5 to 8 hours, from a time point of reaching the reaction temperature from the viewpoint of the balance between the molecular weight finally reached and the productivity. The solid-phase polymerization may be performed in a flow of an inert gas such as nitrogen, or under reduced pressure. The solid-phase polymerization may be performed stationarily or under stirring.

In the present invention, the melting point and the glass transition temperature of the polyamide-imide are a melting point and a glass transition temperature measured at the following "Analysis method: (1) Melting point and glass transition temperature". If the melting point cannot be measured at a temperature up to 350° C. that is the measurement limit, it is determined that the melting point is not detected. When a polyamide-imide to be measured is amorphous, the melting point is not measured.

From the viewpoint of omitting a pulverization process after the polymerization in the solid-phase polymerization method, it is preferable that the raw material salt of polyamide-imide is heated between a temperature lower than the melting point of the bisimide dicarboxylic acid and a temperature higher than 200° C., and polymerization is performed while the bisimide dicarboxylic acid maintains its solid states. The temperature is more preferably equal to or lower than (the melting point of the bisimide dicarboxylic acid −5° C.). This is because the condition of being in solid form of the bisimide dicarboxylic acid can be reliably maintained.

In the melt polymerization method, the reaction temperature is not particularly limited as long as it is equal to or higher than the glass transition temperature of the polyamide-imide to be produced. The reaction time is preferably in the range of 0.5 to 36 hours, more preferably in the range of 1 to 16 hours, from a time point of reaching the reaction temperature from the viewpoint of the balance between the molecular weight finally reached and the productivity. The melt polymerization may be performed in a flow of an inert gas such as nitrogen, or under pressure.

In the method of production of a polyamide-imide of the present invention, a terminal blocking agent, a polymerization catalyst, or other additives may be added, within a range not impairing the advantageous effects of the present invention, in addition to the raw material salt of polyamide-imide, when raw materials are fed into a reaction vessel.

The terminal blocking agent seals the terminal functional group of a polymer. Examples of the terminal blocking agent include acetic acid, lauric acid, benzoic acid, octylamine, cyclohexylamine and aniline. The usage of the terminal blocking agent is preferably 5 mol % or less in relation to the total number of moles of the raw material salt of polyamide-imide.

Examples of the polymerization catalyst include phosphoric acid, phosphorous acid, hypophosphorous acid, and the salts of these acids. The usage of the polymerization catalyst is preferably 2 mol % or less in relation to the total number of moles of the raw material salt of polyamide-imide because an excessive amount of the polymerization catalyst causes the degradation of the performance or the workability of the product.

Examples of other additives include an inorganic filling material, a filler, and a stabilizer. The usage of the additive(s) is preferably 30% by mass or less in relation to the total mass of the raw material salt of polyamide-imide, from the viewpoint of the reactivity of bisimide dicarboxylic acid salt.

Next, the one-step synthesis method will be described.

(One-Step Synthesis Method)

The polyamide-imide of the present invention can be produced by heating a bisimide dicarboxylic acid between a temperature lower than its melting point and higher than 200° C., and adding a diamine while the bisimide dicarboxylic acid maintains its solid states.

In this synthesis, the bisimide dicarboxylic acid may be heated after the addition of the diamine or before the addition of the diamine. The latter is more preferable.

The heating temperature in heating the bisimide dicarboxylic acid in advance before the addition of the diamine is more preferably set at a temperature equal to or lower than (the melting point of the bisimide dicarboxylic acid −5° C.). This is because the condition of being in solid form of the bisimide dicarboxylic acid can be surely maintained.

The specific heating temperature of the bisimide dicarboxylic acid is suitably set within the above temperature range considering bisimide dicarboxylic acid, diamine, or a combination thereof.

Other conditions (such as conditions and methods where the bisimide dicarboxylic acid maintains its solid states, the addition amount of the diamine, the addition rate, and the addition method) can be referred to the conditions described in the above two-step synthesis method.

In the polymerization method of the present invention, it is preferable to use a raw material salt of polyamide-imide. By virtue of the use of the raw material salt of polyamide-imide, it is possible to obtain a polyamide-imide having a higher regularity of molecular structure and less branched structures.

According to the above production method, it is possible to synthesize a polyamide-imide having a degree of polymerization (n) (the number of repeating units) of approximately 4 to 1,000, preferably approximately 10 to 1,000, more preferably approximately 20 to 500.

The degree of polymerization can be adjusted by changing conditions such as the compounding ratio of a bisimide dicarboxylic acid and a diamine, the addition amount of a terminal blocking agent, polymerization temperature, and polymerization time. For example, the degree of polymerization can be increased by decreasing the addition amount of the terminal blocking agent.

In general, the degree of polymerization can be measured by estimation by gel permeation chromatography, nuclear magnetic resonance (NMR), solution viscosity method, or melt viscosity method.

The polyamide-imide of the present invention has a structure in which the repeating unit represented by the general formula (1) is regularly connected in a straight chain form, and branched and crosslinked structures are few.

The polyamide-imide obtained according to the present invention can have a glass transition temperature of at least 100° C., higher than at least 150° C., further higher than at least 250° C., and still further higher than at least 270° C.

Further, when the polyamide-imide obtained according to the present invention has crystallinity, the polyamide-imide can have a melting point of at least 150° C., higher than at least 250° C., further higher than at least 300° C., and still further higher than at least 350° C.

Furthermore, the polyamide-imide obtained according to the present invention can have a 5% weight reduction temperature of at least 300° C., higher than at least 350° C., further higher than at least 380° C., and still further higher than at least 480° C.

The polyamide-imide of the present invention can be molded into a molded article by injection molding, compression molding or extrusion molding. In particular, injection molding is preferable. Examples of the injection molding machine to be used in the injection molding include, without being particularly limited thereto, a screw in-line type injection molding machine and a plunger type injection molding machine. The polyamide-imide heat-melted in a cylinder of the injection molding machine is weighed every shot, injected into a die in a molten state, cooled and solidified in a predetermined shape, and then taken out as a molded article from the die. The resin temperature at the time of injection molding is preferably equal to or higher than the glass transition temperature of the polyamide-imide and more preferably lower than a weight-decrease starting temperature. More preferably, the resin temperature at the time of injection molding is equal to or higher than (the glass transition temperature +50° C.) and equal to or lower than (the 5% weight reduction temperature −10° C.).

The polyamide-imide to be used for injection molding is preferably dried sufficiently. A polyamide-imide with high moisture content undergoes foaming in a cylinder of an injection molding machine, and it may come to be difficult to obtain an optimal molded article. The moisture content of the polyamide-imide to be used for injection molding is preferably less than 0.3% by mass, more preferably less than 0.1% by mass.

Since the polyamide-imide of the present invention has high heat resistance and high chemical resistance, the polyamide-imide can be suitably used for molded articles for automobile parts and electric/electronic parts. Examples of the applications to electric/electronic parts include a belt for copying machine.

The polyamide-imide of the present invention can also be used in a binder for an electrode of a lithium secondary battery or the like.

EXAMPLES

Hereinafter, the present invention will be specifically described based on examples. However, the present invention is not limited to those examples.

Synthesis of Raw Material Salt of Polyamide-Imide

Example 1

A mixture composed of 465 parts by mass of 1,3-bis (N-trimellitimidomethyl) benzene (melting point: not detected, 300° C. or higher) (average particle size: 451 μm) and 0.593 parts by mass of anhydrous sodium hypophosphite was provided to a ribbon blender type reaction apparatus, and was heated to 170° C. in a flow of nitrogen under stirring at the number of revolutions of 70 rpm. Then, 139 parts by mass of m-xylylenediamine (melting point: 14° C.) heated to 25° C. was added at a rate of 0.695 parts by mass/min (0.50% by mass/min) by using a liquid sending device, over 3 hours, to 1,3-bis (N-trimellitimidomethyl) benzene maintained at 170° C. [1,3-bis (N-trimellitimidomethyl) benzene:m-xylylenediamine=47:50 (molar ratio)]. The obtained raw material salt of polyamide-imide was granular (average particle size: 420 μm).

The production of the raw material salt of polyamide-imide was confirmed by an increase in absorption derived from carboxylic acid and amine salt detected in the vicinity of 164 cm$^{-1}$, 1559 cm$^{-1}$, and 1374 cm$^{-1}$ by infrared spectroscopy (IR) and the disappearance of a peak derived from the melting point of m-xylenediamine by differential scanning calorimetry (DSC).

Example 2

A mixture composed of 465 parts by mass of 1,4-bis (N-trimellitimidomethyl) benzene (melting point: not detected. 300° C. or higher) (average particle size: 402 μm) and 0.593 parts by mass of anhydrous sodium hypophosphite was provided to a ribbon blender type reaction apparatus, and was heated to 170° C. in a flow of nitrogen under stirring at the number of revolutions of 70 rpm. Then, 139 parts by mass of m-xylylenediamine (melting point: 14° C.) heated to 25° C. was added at a rate of 0.695 parts by mass/min (0.50% by mass/min) by using a liquid sending device, over 3 hours, to 1,4-bis (N-trimellitimidomethyl) benzene maintained at 170° C. [1,4-bis (N-trimellitimidomethyl) benzene:m-xylylenediamine=47:50 (molar ratio)]. The obtained raw material salt of polyamide-imide was granular (average particle size: 357 μm).

The production of the raw material salt of polyamide-imide was confirmed by an increase in absorption derived from carboxylic acid and amine salt detected in the vicinity of 164 cm$^{-1}$, 1559 cm$^{-1}$, and 1374 cm$^{-1}$ by infrared spectroscopy (IR) and the disappearance of a peak derived from the melting point of m-xylenediamine by differential scanning calorimetry (DSC).

Example 3

A mixture composed of 465 parts by mass of 1,3-bis (N-trimellitimidomethyl) benzene (melting point: not detected, 300° C. or higher) (average particle size: 413 μm) and 0.593 parts by mass of anhydrous sodium hypophosphite was provided to a ribbon blender type reaction apparatus, and was heated to 170° C. in a flow of nitrogen under stirring at the number of revolutions of 70 rpm. Then, a mixed solvent obtained by adding 45 parts by mass of water as a dilute solvent to 139 parts by mass of m-xylylenediamine (melting point: 14° C.) was heated to 25° C. to be added at a rate of 0.736 parts by mass/min (0.40% by mass/min) by using a liquid sending device, over 4 hours, to 1,3-bis (N-trimellitimidomethyl) benzene maintained at 170° C. [1,3-bis (N-trimellitimidomethyl) benzene:m-xylylenediamine=47:50 (molar ratio)]. The obtained raw material salt of polyamide-imide was granular (average particle size: 307 μm).

The production of the raw material salt of polyamide-imide was confirmed by an increase in absorption derived from carboxylic acid and amine salt detected in the vicinity of 164 cm$^{-1}$, 1559 cm$^{-1}$, and 1374 cm$^{-1}$ by infrared spectroscopy (IR) and the disappearance of a peak derived from the melting point of m-xylenediamine by differential scanning calorimetry (DSC).

Example 4

1,3-bis (N-trimellitimidomethyl) benzene (465 parts by mass) (melting point: not detected 300° C. or higher) (average particle size: 378 μm) was provided to a ribbon blender type reaction apparatus, and was heated to 150° C. in a flow of nitrogen and under stirring at the number of revolutions of 70 rpm. Then, 139 parts by mass of m-xylylenediamine (melting point: 14° C.) heated to 25° C. was added at a rate of 0.695 parts by mass/min by using a liquid sending device to 1,3-bis (N-trimellitimidomethyl) benzene maintained at 150° C., and, in addition, 7.5 parts by mass of benzoic acid (melting point: 122° C.) heated to 25° C. was added at a rate of 0.35 parts by mass/min by using a powder sending device equipped with a double damper mechanism. The obtained raw material salt of polyamide-imide was granular (average particle size: 310 μm) [1,3-bis (N-trimellitimidomethyl) benzene:metaxylenediamine:benzoic acid=47:50:3 (molar ratio)].

The production of the raw material salt of polyamide-imide was confirmed by an increase in absorption derived from carboxylic acid and amine salt detected in the vicinity of 164 cm$^{-1}$, 1559 cm$^{-1}$, and 1374 cm$^{-1}$ by infrared spectroscopy (IR) and the disappearance of a peak derived from the melting point of m-xylenediamine by differential scanning calorimetry (DSC).

Synthesis of Polyamide-Imide
1. Analysis Method
(1) Melting Point and Glass Transition Temperature By using a differential scanning calorimeter (DSC8500, manufactured by Perkin-Elmer Corp.), 5 mg of polyamide-imide was used and the temperature was raised at a rate of 20° C./min from 25° C. to 350° C. in a nitrogen environment (1st scan), and was maintained at 350° C. for 5 minutes. Then, the temperature was decreased at a rate of 500° C./min down to 25° C., maintained at 25° C. for 5 minutes, and then further increased at a rate of 20° C./min to 350° C. (2nd Scan). The peak top temperature of the crystal fusion peak observed in the 1st Scan was taken as a melting point, and the temperature corresponding to the midpoint between the two bending points due to the glass transition observed in the 2nd Scan was taken as a glass transition temperature.

(2) 5% Weight Reduction Temperature

By using a thermogravimetry/differential thermal analyzer (TG/DTA "TG/DTA7200", manufactured by Hitachi High-Tech Science Corporation), the temperature was increased at a rate of 10° C./min from 30° C. to 800° C. in a nitrogen atmosphere of 200 mL/min. The temperature at which the mass was reduced by 5% by mass in relation to the mass before the temperature increase was taken as a thermal decomposition temperature.

Example P-1

99.903 parts by mass of the raw material salt of polyamide-imide obtained in Production Example 4 was again added to a ribbon blender type reaction apparatus. Then, 0.097 parts by mass of anhydrous sodium hypophosphite was added to the raw material salt of polyamide-imide and heated at 180° C. for 2 hours in a flow of nitrogen under stirring at the number of revolutions of 50 rpm. Then, the temperature was increased to 200° C., and further heating was performed at 200° C. for 6 hours to obtain a granular polyamide-imide (average particle size: 280 μm).

The melting point of the obtained polyamide-imide was approximately 290° C., the glass transition temperature was 180° C., and the 5% weight reduction temperature was 390° C.

In measurement by nuclear magnetic resonance (NMR), 10 mg of a sample was dissolved in 1 mL of DMSO-d6, and HMBC-two-dimensional NMR measurement was performed at 120° C. No peak derived from side reaction was detected. A peak derived from 13 C at the 2-position of m-xylenediamine, which has an association with both 1H of the methylene group adjacent to the amide bond and 1H of the methylene group adjacent to the imide bond, and which is detected when m-xylenediamine is present, was not found between the amide bonds and the imide bonds. Thereby, it was confirmed that the obtained polyamide-imide had a structure in which the repeating units represented by the formula (1) were connected in a straight chain form.

Example P-2

99.903 parts by mass of the raw material salt of polyamide-imide obtained in Production Example 4 was again added to a ribbon blender type reaction apparatus. Then, 0.097 parts by mass of anhydrous sodium hypophosphite was added to the raw material salt of polyamide-imide and heated at 250° C. for 6 hours in a flow of nitrogen. Then, the temperature was increased to 300° C., and heating was performed for 2 hours to obtain a polyamide-imide in bulk.

The melting point of the obtained polyamide-imide was not detected at a temperature up to 350° C. that is the upper limit in the DSC measurement, the glass transition temperature was 180° C., and the 5% weight reduction temperature was 390° C.

In measurement by nuclear magnetic resonance (NMR), 10 mg of a sample was dissolved in 1 mL of DMSO-d6, and HMBC-two-dimensional NMR measurement was performed at 120° C. No peak derived from side reaction was detected A peak derived from 13 C at the 2-position of m-xylenediamine, which has an association with both 1H of the methylene group adjacent to the amide bond and 1H of the methylene group adjacent to the imide bond, which is detected when m-xylenediamine is present, was not found between the amide bonds and the imide bonds. Thereby, it was confirmed that the obtained polyamide-imide had a structure in which the repeating units represented by the formula (1) were connected in a straight chain form.

Example P-3

4,4-bis (N-trimellitimidophenyl) ether (74.74 parts by mass) was added to a ribbon blender type reaction apparatus. Then, 0.076 parts by mass of anhydrous sodium hypophosphite was added and heated to 250° C. in a flow of nitrogen. While confirming that the shape of 4,4-bis (N-trimellitimidephenyl) ether was maintained, 25.19 parts by mass of solid 4,4'-diaminodiphenyl ether (melting point: 188° C.) was added therein at a rate of 0.084 parts by mass/min (0.333% by mass/min) by using a powder sending device equipped with a double damper mechanism to obtain a polyamide-imide having a granular shape (average particle size: 457 µm).

The melting point of the obtained polyamide-imide was not detected at a temperature up to 350° C. that is the upper limit in the DSC measurement, the glass transition temperature was 258° C., and the 5% weight reduction temperature was 471° C.

In measurement by nuclear magnetic resonance (NMR), 10 mg of a sample was dissolved in 1 mL of DMSO-d6, and 1H-NMR measurement was performed at 120° C. No peak derived from side reaction was detected. A peak was not found near 7.86 ppm (doublet), 7.55 ppm (doublet), and 7.15 ppm (doublet+doublet), which are detected when 4,4'-diaminodiphenyl ether is present, between the amide bonds and the imide bonds. Thereby, it was confirmed that the obtained polyamide-imide had a structure in which the repeating units represented by the formula (1) were connected in a straight chain form.

In Examples P-1 to P-3, granular polyamide-imide containing no gelled product or hydrogen halide could be obtained.

With respect to presence of a gelled product, 10 mg of a sample was dissolved by heating in 1 mL of a solvent (N-methyl-2-pyrrolidone or the like), and whether no undissolved matter was generated was visually confirmed. When no undissolved matter was generated, it was judged that no gelled product was present.

The presence of hydrogen halide was judged based on the presence or absence of chlorine, and the presence of chlorine was confirmed by fluorescent X-ray measurement. When chlorine was not detected by measurement or when the detected amount of chlorine was less than 0.005% by weight, it was judged that chlorine (hydrogen chloride) was not contained.

The invention claimed is:

1. A production method of a raw material salt of polyamide-imide, which comprises a bisimide dicarboxylic acid constituted of a diamine and a tricarboxylic acid anhydride and a diamine, characterized in that:
   the bisimide dicarboxylic acid is heated between a temperature lower than the melting point of the bisimide dicarboxylic acid and a temperature not lower than the melting point of the diamine while the bisimide dicarboxylic acid maintains its solid states,
   wherein the diamine has an aromatic ring and is selected from the group consisting of m-phenylenediamine, p-phenylenediamine, m-xylylenediamine, p-xylylenediamine, benzidine, 4,4'-diaminodiphenylpropane, 4,4'-diaminodiphenylmethane, 4,4'-diaminodiphenyl sulfide, 3,3'-diaminodiphenyl sulfone, 4,4'-diaminodiphenyl ether, 1,5-diaminonaphthalene and 3,3-diaminonaphthalene; the tricarboxylic acid anhydride has an aromatic ring or an aliphatic ring; and a hydrogen atom bonding to the respective rings may be replaced by another atom or an atomic group.

2. A production method of claim 1, wherein the diamine is added to the bisimide dicarboxylic acid with the diamine dissolved in a dilute solvent.

* * * * *